United States Patent [19]

Eastmond et al.

[11] Patent Number: 5,636,213
[45] Date of Patent: Jun. 3, 1997

[54] METHOD, TRANSCEIVER, AND SYSTEM FOR PROVIDING WIRELESS COMMUNICATION COMPATIBLE WITH 10BASE-T ETHERNET

[75] Inventors: Bruce C. Eastmond, Downers Grove; Rachid M. Alameh, Schaumburg, both of Ill.

[73] Assignee: Motorola, Schaumburg, Ill.

[21] Appl. No.: 365,615

[22] Filed: Dec. 28, 1994

[51] Int. Cl.$^6$ ........................................ H04J 3/02
[52] U.S. Cl. ........................ 370/278; 370/445; 455/222
[58] Field of Search ............................ 370/27, 31, 32, 370/32.1, 85.3, 85.1; 340/825.36; 375/243; 359/189; 455/222, 229

[56] References Cited

U.S. PATENT DOCUMENTS

| | | | |
|---|---|---|---|
| 4,742,543 | 5/1988 | Frederiksen | 375/243 |
| 4,843,621 | 6/1989 | Potratz | 370/32 |
| 5,319,363 | 6/1994 | Welch et al. | 340/825.36 |
| 5,355,242 | 10/1994 | Eastmond et al. | 359/189 |
| 5,390,039 | 2/1995 | Yamamoto et al. | 370/85.3 |
| 5,434,775 | 7/1995 | Sims et al. | 364/403 |

*Primary Examiner*—Douglas W. Olms
*Assistant Examiner*—Shick Hom
*Attorney, Agent, or Firm*—Darleen J. Stockley

[57] ABSTRACT

The present invention provides a method (200), transceiver (100), and system (900) for providing wireless communication compatible with 10BASE-T Ethernet. In the transceiver, an absence detector receives a transmitted signal, determines an absence of the transmitted signal, and passes the absence to an activity detector in order to differentiate between a reflected signal and a received signal in a half duplex system. The activity detector receives the received signal and determines an operation time signal in which the received signal is absent.

29 Claims, 4 Drawing Sheets

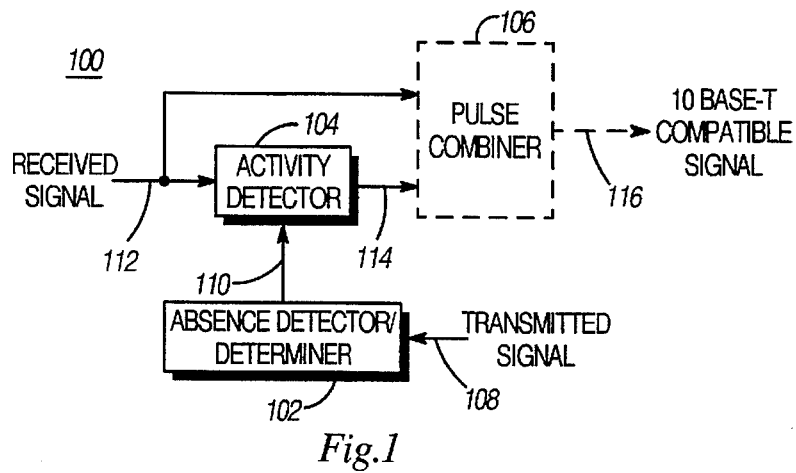
Fig.1
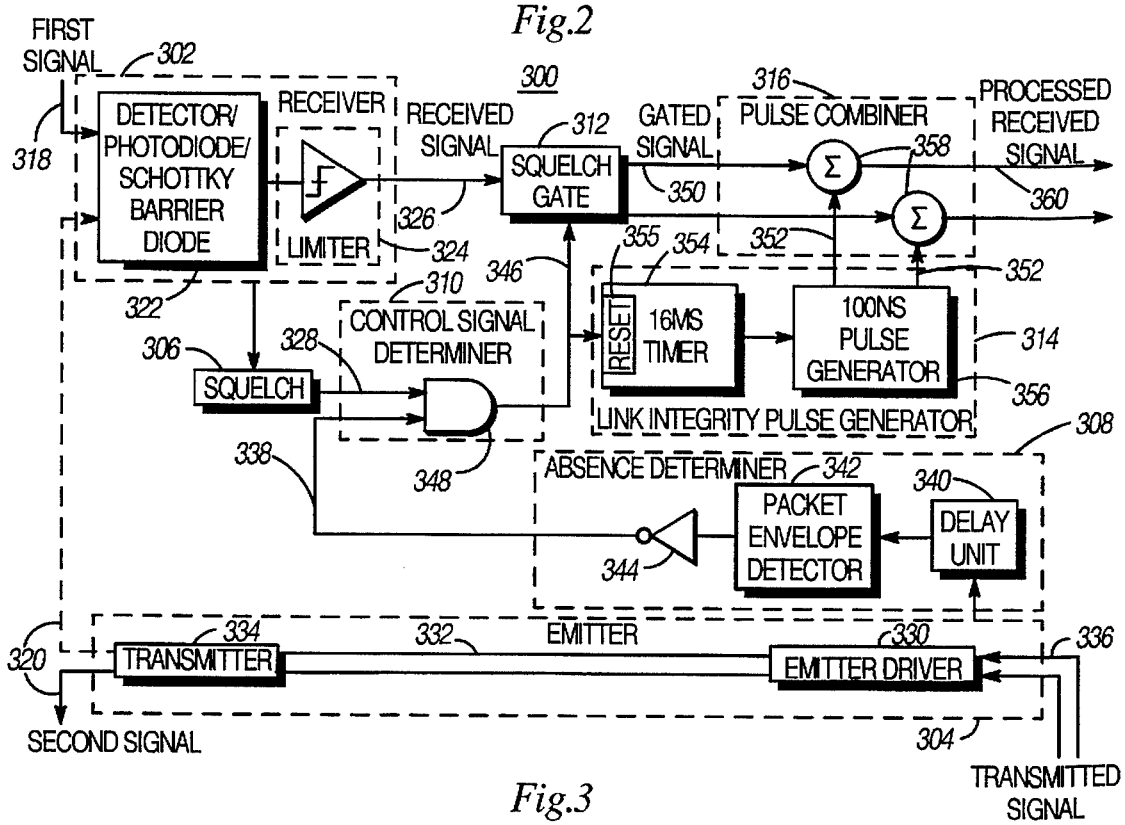
Fig.2
Fig.3

```
     406                                                         602
    ┌──────────────────────────────────────────────────────────────┐
    │ PROVIDING, BY A DELAY DEVICE, A DELAY WITH A TIME DURATION CORRESPOND- │
    │ ING TO A PREDETERMINED MEAN PROPAGATION DELAY OF A REFLECTED │
    │            SIGNAL TO THE OPTICAL RECEIVER                    │
    └──────────────────────────────────────────────────────────────┘
                                  │
                                  ▼                            604
    ┌──────────────────────────────────────────────────────────────┐
    │         DETERMINING, BY A PACKET ENVELOPE DETECTOR,          │
    │               A PRESENCE OF THE SECOND SIGNAL                │
    └──────────────────────────────────────────────────────────────┘
                                  │
                                  ▼                            606
    ┌──────────────────────────────────────────────────────────────┐
    │           INVERTING, BY A NOT GATE, THE PRESENCE OF          │
    │  THE SECOND SIGNAL TO PRODUCE THE ABSENCE OF THE SECOND SIGNAL │
    └──────────────────────────────────────────────────────────────┘
```

*Fig.6*

```
     410                                                         702
    ┌──────────────────────────────────────────────────────────────┐
    │  RECEIVING, BY A EMITTER DRIVER, THE TRANSMITTED SIGNAL AND PROVIDING AN │
    │          EMITTER INPUT AND AN ABSENCE DETERMINER INPUT       │
    └──────────────────────────────────────────────────────────────┘
                                  │
                                  ▼                            704
    ┌──────────────────────────────────────────────────────────────┐
    │  EMITTING THE SECOND SIGNAL OVER AN AZIMUTH ANGLE OF AT LEAST PLUS AND │
    │                      MINUS 90 DEGREES                        │
    └──────────────────────────────────────────────────────────────┘
```

*Fig.7*

```
     414                                                         802
    ┌──────────────────────────────────────────────────────────────┐
    │ PROVIDING, BY A TIMER, A 16 MILLISECOND CLOCK FOR A 100 NANOSECOND PULSE │
    │              GENERATOR BASED ON THE CONTROL SIGNAL           │
    └──────────────────────────────────────────────────────────────┘
                                  │
                                  ▼                            804
    ┌──────────────────────────────────────────────────────────────┐
    │    GENERATING, BY THE 100 NANOSECOND PULSE GENERATOR,        │
    │               THE LINK INTEGRITY PULSE                       │
    └──────────────────────────────────────────────────────────────┘
```

*Fig.8*

METHOD, TRANSCEIVER, AND SYSTEM FOR PROVIDING WIRELESS COMMUNICATION COMPATIBLE WITH 10BASE-T ETHERNET

FIELD OF THE INVENTION

The present invention relates generally to 10BASE-T Ethernet networks, and more particularly to wireless 10BASE-T Ethernet networks.

BACKGROUND OF THE INVENTION

Since 1990, the wired local area network defined by IEEE (The Institute of Electrical and Electronics Engineers, Inc.) standard 802.3 10BASE-T, an acronym which stands for 10 Mbit/s, baseband transmission, twisted-pair wiring, has rapidly become preeminent. In addition to its widespread use in new installations, it has, in many cases, supplanted earlier coaxial cable Ethernet and Token-Ring installations. The number of 10BASE-T installations is already large and continues to grow rapidly.

10BASE-T network stations are each connected to a repeater via a duplex, unshielded twisted-pair cable. The repeater accepts a transmitted signal from one station and repeats it to the receivers of all the other stations. This topology facilitates changes and fault location, and the unshielded twisted-pair cable is inexpensive and easy to co-install with telephone wiring. Sixteen-port repeaters of a basic design are easily affordable by small businesses. A local area network repeater may also be connected to a metropolitan area network, wide area network, the Internet, and the proposed "information highway".

Prior to 1993, most stations connected to the 10BASE-T network were desktop personal computers; however, it is becoming increasingly common for portable computing units to be equipped with accessory slots conforming to the PCMCIA standard which can accept credit card-sized 10BASE-T adapters. The users of portable computing units would receive significant benefit from a means for extending the 10BASE-T network to establish communication ad hoc among collaborators on a common task, between desktop and portable computers, or with the wired network. Two 10BASE-T stations can form a "network" using a cross-connected cable in which the transmitter of the first station is connected to the receiver of the second station and vice versa. However, since n stations require $[n/2]\cdot[n-1]$ duplex twisted-pair cables, it is impracticable for a multi-station ad hoc network to be connected in this manner.

The prior art includes a variety of IR, or infrared, and RF, or radio frequency, systems. Prior-art IR systems are limited to less than 10 Mbit/s by either the choice of modulation technique or receiver design limitations or are so directive that it would be difficult or impossible to form a collaborative network of portable computers. Prior art RF systems are either limited by spectrum availability to much less than 10 Mbit/s, or designed for stationary mounting and alternating current powered operation.

The environment of a 10BASE-T network extension is local, which minimizes the range and coverage requirements, as well as the likelihood of "hidden" stations. Thus, either IR optical or microwave radio frequencies are appropriate to convey the Ethernet signal by on-off keyed modulation. On-off keyed modulation is spectrally efficient and simple to generate and detect. Signal emission in an IR optical receiver may employ one or more light-emitting diodes, such as the Stanley Electric Co., Ltd. DN304, or laser diodes, while signal emission in a microwave RF transmitter may employ a Gunn diode of the type used in law-enforcement speed detectors. Signal detection in an IR optical receiver may employ one or more photodiodes, while signal detection in a microwave RF receiver may employ a Schottky barrier diode. Information transmitted using IR optical signals is inherently private and resistant to interference since most building materials are opaque. In addition, the generation of IR optical signals does not require a license, and safety and international spectrum regulation issues are avoided.

The CSMA/CD, or carrier sense, multiple access with collision detection, protocol specified by the IEEE 802.3 Ethernet standard provides for greater network throughput by quickly aborting transmissions involved in collisions, or simultaneous transmissions by two transmitters. The protocol determines that a collision has occurred when a station detects the presence of a valid signal on its receiving pair during the time that its transmitting pair is active. In the wired 10BASE-T environment, it is certain that the colliding signal originates from a second station. However, if the transmitting and receiving pairs of each station are not connected to the repeater but to a wireless emitter and receiver, respectively, then the wireless receiver will often respond to its own emitter due to reflection from nearby objects or surfaces. Under this condition, the 10BASE-T hardware and protocol will identify every transmission as a collision, the collision protocol will be continuously engaged, and the network will become inoperative. Thus, standard 10BASE-T Ethernet hardware and protocol is inadequate when the wire transmission medium is replaced with a wireless transmission medium.

The 10BASE-T Ethernet protocol also provides for verifying the integrity of the twisted-pair connection between the network station and repeater by sending link integrity pulses having a duration of 100 nanoseconds at 16 millisecond intervals during the time when no data is being transmitted. If neither a data packet nor a link integrity pulse is received for a typical duration of 110 ms, then the protocol enters the link test fail state, and the transmit and receive functions are inhibited. When either a data packet or, typically, four consecutive link integrity pulses are received, then the Ethernet adapter will exit the link test fail state and re-enable the transmit and receive functions. Since a wireless receiver may not respond reliably to an isolated 100 nanosecond pulse, and many Ethernet adapters do not provide for disabling the link integrity test function, the 10BASE-T Ethernet link test will inhibit operation of the network if it is used in the wireless environment.

Accordingly, there is a need for a wireless method, transceiver and system which is compatible with a standard, twisted-pair 10BASE-T Ethernet interface or card so that the wired and wireless environments can be made equivalent. If such a wireless method, transceiver and system were available then file-sharing and communications capabilities could be user-defined by the same operating system or networking software in either the wired or the wireless environment. Moreover, wireless access to the wired 10BASE-T local area network would be greatly simplified since no protocol or data rate translation would be required.

BRIEF DESCRIPTION OF THE DRAWINGS

FIG. 1 is a block diagram of a preferred embodiment of a transceiver which provides wireless communication compatible with 10BASE-T Ethernet in accordance with the present invention.

FIG. 2 is a flow diagram of steps for implementing a preferred embodiment of a method for providing wireless communication compatible with 10BASE-T Ethernet in accordance with the present invention.

FIG. 3 is a block diagram of an alternative embodiment of a transceiver which provides wireless communication compatible with 10BASE-T Ethernet in accordance with the present invention.

FIG. 6 is a flow diagram, shown in greater detail, of one embodiment of a step from FIG. 4 for determining, by a presence determiner, the presence of the second signal in accordance with the present invention.

FIG. 7 is a flow diagram, shown in greater detail, of one embodiment of a step from FIG. 4 for receiving, by the emitter, a transmitted signal and providing for an emission of the second signal in accordance with the present invention.

FIG. 8 is a flow diagram, shown in greater detail, of one embodiment of a step from FIG. 4 for generating, by a link integrity pulse generator, a link integrity pulse based on the control signal in accordance with the present invention.

DETAILED DESCRIPTION OF A PREFERRED EMBODIMENT

Figure 4:
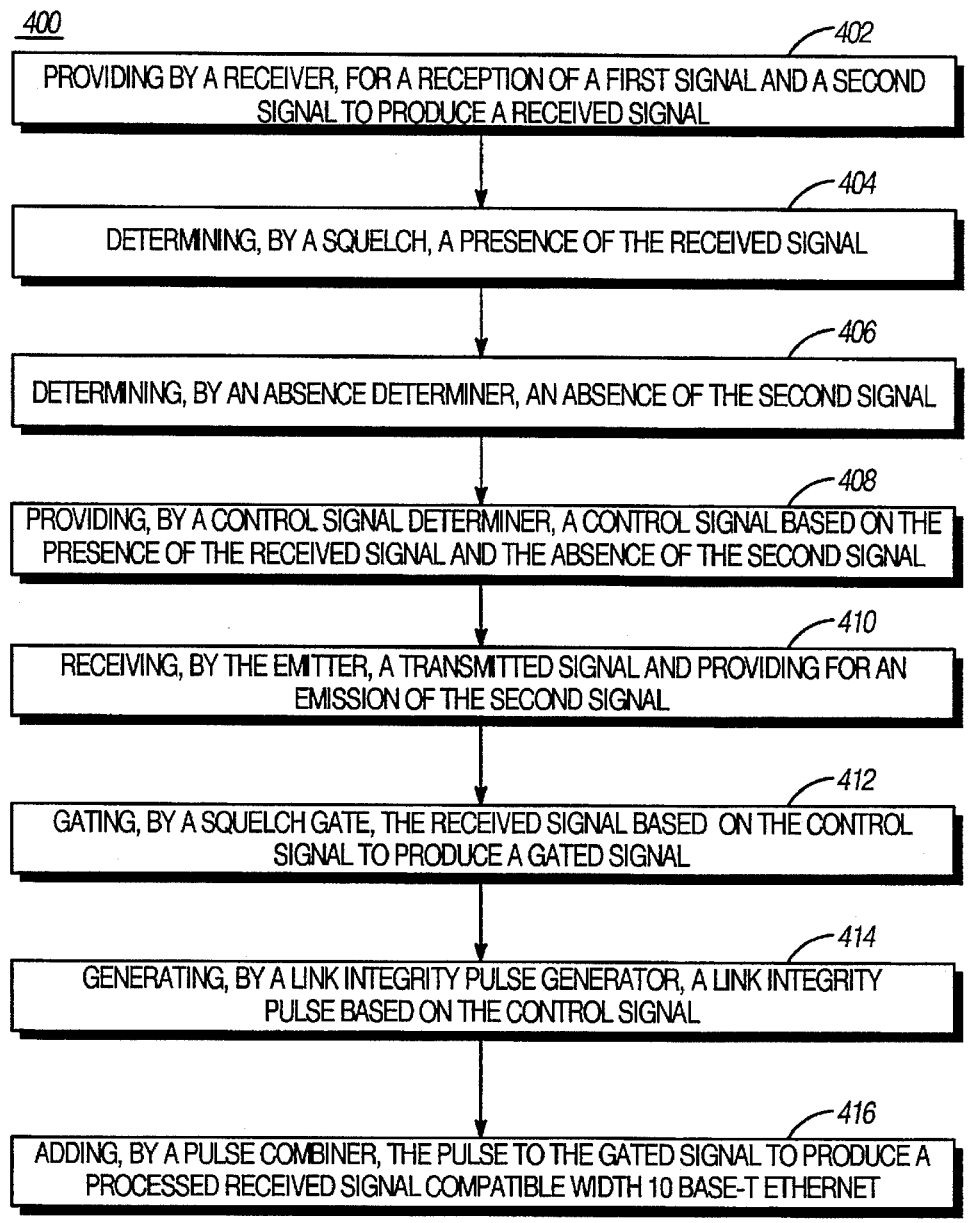
FIG. 4 is a flow diagram of steps for implementing an alternative embodiment of a method for providing wireless communication compatible with 10BASE-T Ethernet in accordance with the present invention.

Generally, the present invention provides a method, transceiver, and system for providing wireless communication compatible with 10BASE-T Ethernet.

FIG. 1, numeral 100, is a block diagram of a preferred embodiment of a transceiver which provides wireless communication compatible with 10BASE-T Ethernet in accordance with the present invention. The transceiver comprises an absence detector (102) and an activity detector (104). A pulse combiner (106) may also be included in the transceiver.

The absence detector (102) receives a transmitted signal (108) for determining an absence (110) of the transmitted signal and passing the absence (110) to the activity detector (104) in order to differentiate between a reflected signal and a received signal (112), in a half duplex system.

The activity detector (104) is operably coupled to receive the received signal (112) and to the absence detector (102) for determining an operation time signal (114) in which the received signal is absent.

The pulse combiner (106) is operably coupled to receive the received signal (112) and operably coupled to the activity detector (104) for combining a link integrity pulse with the received signal (112) when the operation time signal (114) indicates to provide a 10BASE-T Ethernet compatible signal (116). The pulse combiner (106) is not necessary if the need for a link integrity pulse is overridden in subsequent processing of the 10BASE-T Ethernet compatible signal (116).

FIG. 2, numeral 200, is a flow diagram of steps for implementing a preferred embodiment of a method for providing wireless communication compatible with 10BASE-T Ethernet in accordance with the present invention. The first step is differentiating between a reflected signal originating from a local transmitter and a received signal originating from a remote transmitter, in a half duplex system, by determining an absence of the reflected signal originating from a local transmitter (202). The second step is determining an operation time in which the received signal is absent (204). A final step may be combining a link integrity pulse with the received signal during the operation time to provide a signal compatible with 10BASE-T Ethernet (206).

FIG. 3, numeral 300, is a block diagram of an alternate embodiment of a transceiver which provides wireless communication compatible with 10BASE-T Ethernet in accordance with the present invention. The transceiver comprises a receiver (302), an emitter (304), a squelch (306), an absence determiner (308), a control signal determiner (310), a squelch gate (312), a link integrity pulse generator (314), and a pulse combiner (316).

The receiver (302) receives a first wireless signal (318) which originates from a point external to the transceiver, and may receive a second wireless signal (320) which originates from the emitter (304). The presence of second wireless signal (320) at receiver (302) depends upon the presence of reflective materials in proximity to transceiver (300). The receiver includes at least a detector (322) and limiter (324) for producing received signal (326). Limiter (324) produces a binary signal output, with the transition between levels corresponding to first signal (318) or second signal (320) if present; or to detector (322) noise if neither signal is present. If the first and second signals are optical signals, receiver (302) may be as described in Eastmond, et al., "Receiver for Binary Coded Wireless Optical Data", U.S. Pat. No. 5,355,242, issued Oct. 11, 1994 and assigned to Motorola, Inc., which patent is hearby incorporated by reference.

The squelch (306), operably coupled to receiver (302), responds to the presence of first signal (318) or second signal (320) by producing an indication of received signal presence (328). Squelch (306) may determine signal presence from the time distribution of transitions in received signal (326), or from a received signal strength indicator RSSI, known in the art, derived from limiter (324). If the first and second signals are binary encoded data, then squelch (306) may be as described in Alameh, et al., "Method and Apparatus for Detecting Binary Encoded Data", U.S. patent application Ser. No. 08/042,910, filed Apr. 5, 1993, which application is hearby incorporated by reference.

In the emitter (304), emitter driver (330) creates a transmitter control signal (332) for control of transmitter (334) in response to a transmitted signal (336). If the transmitted signal (336) is an Ethernet data signal then it consists of data packets which comprise a plurality of Manchester-encoded bits transmitted at a 10 Mbit/s rate.

The absence determiner (308), operably coupled to receive a transmitted signal (336), produces an indication of second signal absence (338). Absence determiner (308) comprises a time delay (340), having a delay time, t, a packet envelope detector (342), and an inverter gate (344). The time delay (340) may consist of one or more tandem logic gates, or other means well-known in the art for achieving a delay time, t, which corresponds to the propagation delay experienced by the second signal (320) in passing from transmitter (334) through receiver (302). Packet envelope detector (342) may consist of a monostable multivibrator, resistor-capacitor network, or other means well-known in the art for determining the presence of the transmitted signal envelope.

Inverter gate (344) inverts the polarity of the packet envelope detector to produce the indication of second signal absence (338).

The control signal determiner (310) is coupled to absence determiner (308) and to the squelch (306) for producing a control signal (346) based on the simultaneous occurrence of both signal presence (328) and second signal absence (338). The control signal determiner (310) is comprised of a two-input AND gate (348); however, other combinations of standard logic elements may be chosen which are equivalent in operation to the two-input AND gate (348).

The squelch gate (312) coupled to received signal (326) and controlled by control signal (346) operates so that gated signal (350) comprises only the first signal (318). Both the receiver noise and second signal (320) are blocked from the gated signal (350).

The link integrity pulse generator (314), is coupled to control signal (346) for generating 100 nanosecond pulses (352) at 16 millisecond intervals in the absence of control signal (346). The link integrity pulse generator (314) is comprised of a 16 millisecond timer (354) coupled to a 100 nanosecond pulse generator (356). The control signal (346) is connected to a reset (355) of the 16 millisecond timer (354). The 100 nanosecond pulses (352) are each added by a pair of summers (358) to the gated signal (350) in the pulse combiner (316) to produce a processed received signal (356).

FIG. 4, numeral 400, is a flow diagram of steps for implementing an alternative embodiment of a method for providing wireless communication compatible with 10BASE-T Ethernet in accordance with the present invention. The steps include the following: providing, by a receiver, in step (402), for reception of a first signal and a second signal to produce a received signal; determining, by a squelch, in step (404), a presence of the received signal; determining, by an absence determiner, in step (406), the absence of the second signal; providing, by a control signal determiner, in step (408), a control signal based on the presence of the received signal and the absence of the second signal; receiving, by the emitter, in step (410), a transmitted signal and providing for an emission of the second signal; gating, by a squelch gate, in step (412), the received signal based on the control signal to produce a gated signal; generating, by a link integrity pulse generator, in step (414), a link integrity pulse based on the control signal; and adding, by a pulse combiner, in step (416), the pulse to the gated signal to produce a processed received signal compatible with 10BASE-T Ethernet.

Figure 5:
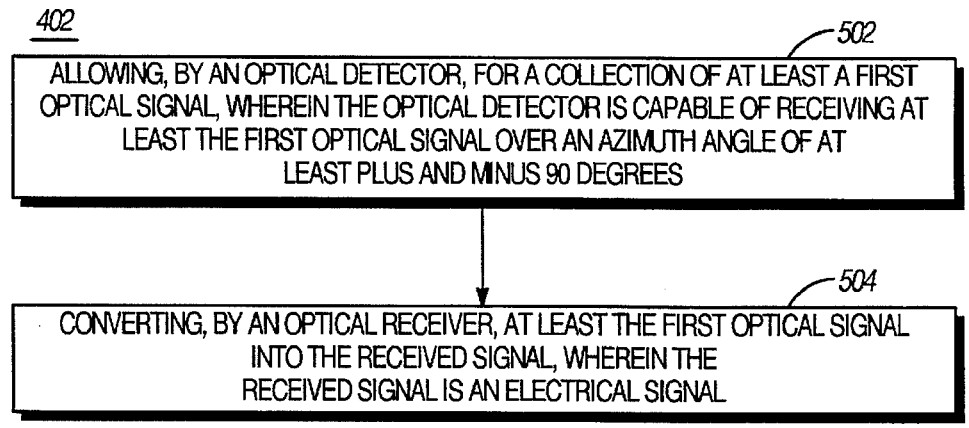
FIG. 5 is a flow diagram, shown in greater detail, of one embodiment of a step from FIG. 4 for providing, by a receiver, for a reception of a first signal and a second signal to provide a received signal in accordance with the present invention.

FIG. 5, numeral 402, is a flow diagram, shown in greater detail, of one embodiment of a step from FIG. 4 for providing, by a receiver, for a reception of a first signal and a second signal to provide a received signal in accordance with the present invention. The flow diagram comprises the following: allowing, by a detector, in step (502), for the reception of at least a first signal, wherein the detector is capable of receiving at least the first signal over an azimuth angle of at least plus and minus 90 degrees; and converting, by a receiver, in step (504), at least the first signal into the received signal, wherein the received signal is an electrical signal.

FIG. 6, numeral 406, is a flow diagram, shown in greater detail, of one embodiment of a step from FIG. 4 for determining, by a presence determiner, the presence of the second signal in accordance with the present invention. The flow diagram comprises the following: providing, by a delay unit, in step (602), a delay with a time duration corresponding to a predetermined mean propagation delay of a reflected signal to the receiver; determining, by a packet envelope detector, in step (604), a presence of the second signal; and inverting, by an inverter gate, in step (606), the presence of the second signal to produce the absence of the second signal.

FIG. 7, numeral 410, is a flow diagram, shown in greater detail, of one embodiment of a step from FIG. 4 for receiving, by the emitter, a transmitted signal and providing for an emission of the second signal in accordance with the present invention. The flow diagram comprises the following: receiving, by an emitter driver, in step (702), the transmitted signal and providing an emitter input and an absence determiner input; and emitting, in step (704), the second signal over an azimuth angle of at least plus and minus 90 degrees.

FIG. 8, numeral 414, is a flow diagram, shown in greater detail, of one embodiment of a step from FIG. 4 for generating, by a link integrity pulse generator, a link integrity pulse based on the control signal in accordance with the present invention. The flow diagram comprises the following: providing, by a timer, in step (802), a 16 millisecond clock for a 100 nanosecond pulse generator based on the control signal; and generating, by the 100 nanosecond pulse generator, in step (804), the link integrity pulse.

Figure 9:
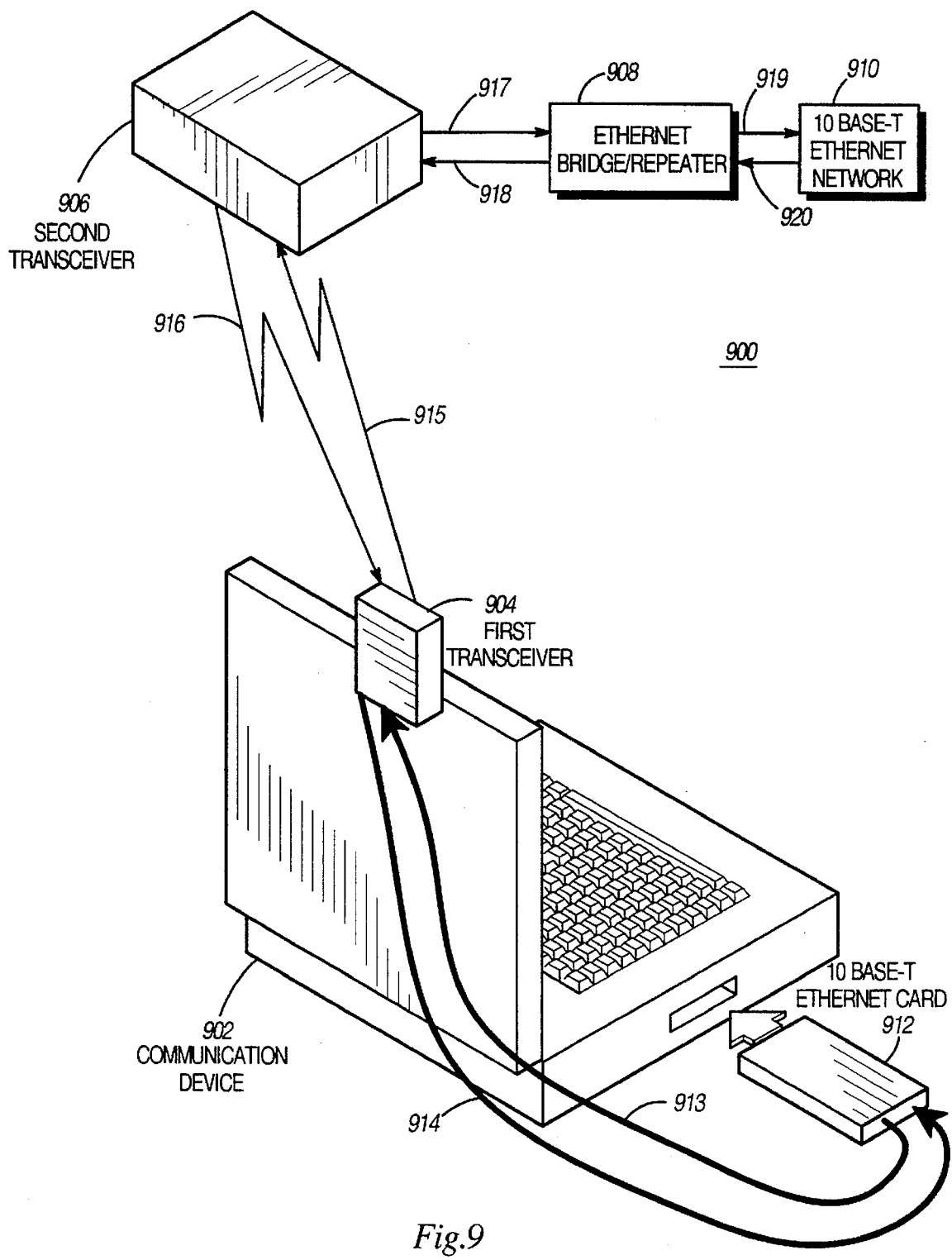
FIG. 9 is a block diagram of a system which provides wireless communication compatible with 10BASE-T Ethernet in accordance with the present invention.

FIG. 9, numeral 900, is a block diagram of a system which provides wireless communication compatible with 10BASE-T Ethernet in accordance with the present invention. A first transceiver (904), operably coupled to communication unit (902), receives a second Ethernet transmitted signal (913) from 10BASE-T Ethernet card (912), and transmits a first Ethernet processed received signal (914) to the 10BASE-T card (912). The first transceiver (904) produces the first Ethernet processed received signal (914) in response to first wireless signal (916), and produces a second wireless signal (915) in response to the second Ethernet transmitted signal (913). A second transceiver (906), produces a third Ethernet signal (917) in response to the second wireless signal (915) received from first transceiver (904), and produces the first wireless signal (916) in response to a fourth Ethernet signal (918). An Ethernet bridge (908), operably coupled to second transceiver (906), converts a fifth Ethernet signal (920) received from a 10BASE-T network (910) to the fourth Ethernet signal (918), and converts the third Ethernet signal (917) to a sixth Ethernet signal (919) sent to the 10BASE-T network (910).

A method, transceiver, and system for providing wireless communication compatible with 10BASE-T Ethernet has been described which achieves equivalency in file-sharing and communications capabilities between the wired and wireless environments. Wireless access to a wired 10BASE-T local area network is greatly simplified since no protocol translation is required.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A transceiver for providing wireless communications compatible with 10 BASE-T Ethernet, the transceiver comprising:

A) an absence detector/determiner, operably coupled to a transmitted signal, for determining an absence of the transmitted signal and passing the absence to an activity detector in order to differentiate between a reflected signal and a received signal, in a half duplex system; and B) the activity detector, operably coupled to receive the received signal and to the absence detector, for determining an operation time signal in which the received signal is absent.

2. The transceiver of claim 1, wherein the transceiver further comprises a pulse combiner, operably coupled to receive the received signal and operably coupled to the activity detector, for combining a link integrity pulse with the received signal when the operation time signal indicates to provide a signal compatible with 10BASE-T Ethernet.

3. A method for providing wireless communications compatible with 10 BASE-T Ethernet, the method comprising:

A) differentiating between a reflected signal originating from a local transmitter and a received signal originating from a remote transmitter, in a half duplex system, by determining an absence of the reflected signal originating from a local transmitter; and B) determining an operation time in which the received signal is absent.

4. The method of claim 3, wherein the method further comprises a final step of combining a link integrity pulse with the received signal during the operation time to provide a signal compatible with 10BASE-T Ethernet.

5. A transceiver for providing wireless communication compatible with 10BASE-T Ethernet, the transceiver comprising:

A) a receiver, operably coupled to receive a first signal and a second signal, for producing a received signal;

B) a squelch, operably coupled to the receiver, for determining a presence of the received signal;

C) an absence determiner, operably coupled to an emitter, for determining an absence of the second signal;

D) a control signal determiner, operably coupled to the squelch and the absence determiner, for providing a control signal based on the presence of the received signal and the absence of the second signal;

E) the emitter, operably coupled to the absence determiner, for receiving a transmitted signal and providing for an emission of the second signal, F) a squelch gate, operably coupled to the control signal determiner and receiver, for gating the received signal based on the control signal to produce a gated signal;

G) a link integrity pulse generator, operably coupled to the control signal determiner, for generating a link integrity pulse based on the control signal; and H) a pulse combiner, operably coupled to the squelch gate and the link integrity pulse generator, for adding the link integrity pulse to the gated signal to produce a processed received signal compatible with 10BASE-T Ethernet.

6. The transceiver of claim 5, wherein the first signal and the second signal are transmitted using on-off keyed modulation.

7. The transceiver of claim 5, wherein the first signal and the second signal are optical signals.

8. The transceiver of claim 5, wherein the first signal and the second signal are microwave radio frequency signals.

9. The transceiver of claim 5, wherein the receiver further comprises:

A) a detector for allowing for a collection of at least a first signal, wherein the detector is capable of receiving at least the first signal over an azimuth angle of at least plus and minus 90 degrees; and B) a receiver, operably coupled to the detector, for converting at least the first signal into the received signal, wherein the received signal is an electrical signal.

10. The transceiver of claim 9, wherein the detector is comprised of at least a first photodiode.

11. The transceiver of claim 9, wherein the detector is comprised of a Schottky barrier diode.

12. The transceiver of claim 5, wherein the absence determiner further comprises:

A) a delay unit for providing a delay with a time duration corresponding to a predetermined mean propagation delay of a reflected signal to the receiver;

B) a packet envelope detector, operably coupled to the delay unit, for determining a presence of the second signal; and C) an inverter gate, operably coupled to the packet envelope detector, for inverting the presence of the second signal to produce the absence of the second signal.

13. The transceiver of claim 5, wherein the control signal determiner is an AND gate.

14. The transceiver of claim 5, wherein the emitter further comprises:

A) an emitter driver for receiving the transmitted signal and providing an emitter input and an absence determiner input; and B) a transmitter, operably coupled to the emitter driver, for emitting the second signal over an azimuth angle of at least plus and minus 90 degrees.

15. The transceiver of claim 5, wherein the link integrity pulse generator further comprises:

A) a timer for providing a 16 millisecond clock for a 100 nanosecond pulse generator based on the control signal; and B) a 100 nanosecond pulse generator, operably coupled to the timer, for generating the link integrity pulse.

16. A method for providing wireless communication compatible with 10BASE-T Ethernet, the method comprising:

A) providing, by a receiver, for a reception of a first signal and a second signal to provide a received signal;

B) determining, by a squelch, a presence of the received signal;

C) determining, by an absence detector/determiner, an absence of the second signal;

D) providing, by a control signal determiner, a control signal based on the presence of the received signal and the absence of the second signal;

E) receiving, by an emitter, a transmitted signal and providing for an emission of the second signal;

F) gating, by a squelch gate, the received signal based on the control signal to provide a gated signal;

G) generating, by a link integrity pulse generator, a link integrity pulse based on the control signal; and H) adding, by a pulse combiner, the link integrity pulse to the gated signal to provide a processed received signal compatible with 10BASE-T Ethernet.

17. The method of claim 16, wherein the first signal and the second signal are transmitted using on-off keyed modulation.

18. The method of claim 16, wherein the first signal and the second signal are optical signals.

19. The method of claim 16, wherein the first signal and the second signal are microwave radio frequency signals.

20. The method of claim 16, wherein step A) further comprises:
   A) allowing, by a detector, for a reception of at least a first signal, wherein the detector is capable of receiving at least the first signal over an azimuth angle of at least plus and minus 90 degrees; and
   B) converting, by a receiver, at least the first signal into the received signal, wherein the received signal is an electrical signal.

21. The method of claim 20, wherein the detector is comprised of at least a first photodiode.

22. The method of claim 20, wherein the detector is comprised of a Schottky barrier diode.

23. The method of claim 16, wherein step C) further comprises:
   A) providing, by a delay unit, a delay with a time duration corresponding to a predetermined mean propagation delay of a reflected signal to the receiver;
   B) determining, by a packet envelope detector, a presence of the second signal; and
   C) inverting, by an inverter gate, the presence of the second signal to produce the absence of the second signal.

24. The method of claim 16, wherein the control signal determiner is an AND gate.

25. The method of claim 16, wherein step E) further comprises:
   A) receiving, by an emitter driver, the transmitted signal and providing an emitter input and an absence determiner input; and
   B) emitting the second signal over an azimuth angle of at least plus and minus 90 degrees.

26. The method of claim 16, wherein step G) further comprises:
   A) providing, by a timer, a 16 millisecond clock for a 100 nanosecond pulse generator based on the control signal; and
   B) generating, by the 100 nanosecond pulse generator, the link integrity pulse.

27. A system for providing wireless communication compatible with 10BASE-T Ethernet, wherein the wireless communication is between a communication unit and a 10BASE-T Ethernet network, the system comprising:
   A) a first transceiver, operably coupled to the communication unit, for receiving a first wireless signal to provide a first Ethernet processed received signal and transmitting a second wireless signal based on a second Ethernet signal;
   B) a second transceiver, responsive to the second wireless signal of the first transceiver, for receiving the second wireless signal to provide a third Ethernet signal and transmitting the first wireless signal based on a fourth Ethernet signal; and
   C) an Ethernet bridge, operably coupled to the second transceiver, for communicating the third Ethernet signal and the fourth Ethernet signal with a 10BASE-T Ethernet network.

28. The system of claim 27, wherein the communication unit is a portable computer.

29. The system of claim 27, wherein the system further comprises a 10BASE-T Ethernet card, operably coupled to the first transceiver, for converting the first Ethernet signal to a communication unit input and converting a user input to the second Ethernet signal.

* * * * *